United States Patent [19]
Watanabe et al.

[11] Patent Number: 5,367,560
[45] Date of Patent: Nov. 22, 1994

[54] TELEPHONE ANSWERING DEVICE WITH A PLURALITY OF PASSWORDS

[75] Inventors: Yoshiyuki Watanabe, Kokubunji; Kozo Toda, Yokohama, both of Japan

[73] Assignee: Canon Kabushiki Kaisha, Tokyo, Japan

[21] Appl. No.: 888,465

[22] Filed: May 21, 1992

Related U.S. Application Data

[63] Continuation of Ser. No. 601,436, Oct. 23, 1990, abandoned.

[30] Foreign Application Priority Data

Oct. 24, 1989 [JP] Japan .................. 1-276477
Mar. 6, 1990 [JP] Japan .................. 2-54395

[51] Int. Cl.⁵ .......................................... H04M 11/10
[52] U.S. Cl. ...................................... 379/72; 379/201; 379/67; 379/88
[58] Field of Search .................. 369/67, 68, 70, 77, 369/74, 78; 379/201, 67, 68, 70, 77, 74, 88

[56] References Cited

U.S. PATENT DOCUMENTS

| | | | |
|---|---|---|---|
| 4,617,425 | 10/1986 | Nakamura | 179/6.11 |
| 4,747,126 | 5/1988 | Hood et al. | 379/74 |
| 4,757,525 | 7/1988 | Matthews | 379/89 |
| 4,996,704 | 2/1991 | Brunson | 379/67 |

*Primary Examiner*—James L. Dwyer
*Assistant Examiner*—Michael N. Lau
*Attorney, Agent, or Firm*—Fitzpatrick, Cella, Harper & Scinto

[57] ABSTRACT

An information reproducing apparatus includes reproduction device for reproducing information recorded on a medium, and a controller for starting the reproduction of information by the reproduction device from a position indicated by data showing a predetermined position on the medium and stopping the reproduction of information by the reproduction device when predetermined information is reproduced by the reproduction device.

41 Claims, 9 Drawing Sheets

FIG. 10

| MESSAGE NO. | SIGNAL TABLE | REPRODUCTION BY PASSWORD Pa | REPRODUCTION BY PASSWORD Pb |
|---|---|---|---|
| 1 | Ta | ○ | ↓ |
| 2 | NO SIGNAL | ○ | ○ |
| 3 | Tb | ↓ | ○ |
| 4 | NO SIGNAL | ○ | ○ |
| ∫ | ∫ | ∫ | ∫ |

TELEPHONE ANSWERING DEVICE WITH A PLURALITY OF PASSWORDS

This application is a continuation of application Ser. No. 07/601,436 filed Oct. 23, 1990, now abandoned.

BACKGROUND OF THE INVENTION

1. Field of the Invention

The present invention relates to an information reproducing apparatus for reproducing information recorded on a medium.

2. Related Background Art

A prior art automatic message record telephone apparatus comprises two major units, an out-going message (OGM) sender and an in-coming message (ICM) recorder/reproducer. The automatic message record telephone apparatus is defined as a telephone apparatus at a called party which automatically records a message of a calling party when an operator at the called party is absent.

The OGM sender holds and sends out a response message requesting the calling party to record a message. The response message has been previously recorded in the telephone apparatus when the operator is at home. The ICM recorder/reproducer records and reproduces a message spoken by the calling party in accordance with the response message.

The OGM sender usually uses a voice recording/reproducing IC which records and reproduces voice information by converting analog voice information to digital voice data and storing the latter in a memory.

As the OGM, a message to request to the calling party to record a message such as "I am out now. Please speak your message after you hear a signal tone "see"" is prerecorded in the voice recording/reproducing IC.

On the other hand, as the ICM recorder/reproducer, a tape recorder/reproducer which uses a microcassette tape or a compact cassette tape is frequently used because of long recording time and high quality are required as compared to the OGM.

The operation of the automatic message record telephone apparatus is now explained. When an operator goes out, he/she set the automatic message record telephone apparatus be in an absence mode. When a telephone call is received, the automatic message record telephone apparatus detects the call and sends out the OGM which has previously been recorded by the operator. In order to signal the beginning of the message by the calling party, a signal tone (beep tone) is sent out. At the same time, an ICM record mode is started and the tape is driven so that the ICM of the calling party is recorded on the tape. When the calling party finishes talking, the automatic message record telephone apparatus detects it and completes the record operation of one ICM.

While the telephone apparatus is set in the absence mode, the above operation is repeatedly executed each time a call is received, and the ICM's from the calling parties are sequentially recorded.

In many cases, the operator who is outside the home may hear the ICM's through a telephone set outside the home by a remote control operation.

The operator who is at outside the home sends out a password (ID number) and an operation command via a PB signal (DTMF signal) of the outside telephone set to rewind and fast-feed the tape on which the ICM's from the calling parties have been sequentially recorded and remotely hear the ICM's through the outside telephone set.

Because of the remotely controlled tape operation, a tape position at the end of the remote control operation shifts from the position at the start of the remote control operation. In order to assure that the subsequent ICM record follows the previously recorded ICM as shown in FIG. 6, it is necessary to return the tape position to the position at the start of the remote control operation, that is, the last position in the previous recording.

To this end, in the prior art apparatus, pulse signals generated as a tape reel mount is rotated when the tape is driven are counted or the beep tone signal recorded in the ICM record mode is detected to control the tape position so that the tape is returned to the original position.

However, in the prior art technique in which the rotation of the tape reel mount is detected by counting the pulse signals to control the tape position, if the rotation of the tape reel mount is largely affected by the expansion or shrinkage of the magnetic tape by temperature or humidity, and by ununiform winding tension of the tape by a rotation torque, inconsistency between the rotation of the reel mount and the actual travel distance of the tape increases and precise tape control is difficult to attain.

In the prior art technique in which the beep tone recorded between the ICM's is detected to control the tape position, fast forward feeding and rewinding are carried out while a magnetic head contacts the tape. As a result, the damage to the tape and the wear of the magnetic head are significant. Further, where a sound whose frequency is close to the beep tone signal frequency is included in the ICM, the chance of misdetection is high and proper tape position control is not attained.

Further, the prior art automatic message record telephone apparatus can only reproduce all recorded messages through the remote control operation.

However, where one automatic message record telephone apparatus is shared by more than one person, each co-owner can hear all the messages. Thus, a message which one co-owner does not want to be heard by others is heard by others. This is not desirable from the standpoint of security of secrecy.

On the other hand, it is necessary to hear all messages which the coowner does not want to hear. This results in poor efficiency in time.

SUMMARY OF THE INVENTION

It is an object of the present invention to provide an information reproducing apparatus which terminates the reproduction of information at a proper position on a medium.

It is another object of the present invention to provide a recording/reproducing apparatus which resumes the recording of information at a proper position on a medium.

It is another object of the present invention to increase the durability of a magnetic head and a magnetic tape.

It is another object of the present invention to improve the operability of an automatic message record telephone apparatus.

It is another object of the present invention to increase the secrecy/security function of an automatic message record telephone apparatus.

Other objects of the present invention will be apparent from the description of the embodiment.

BRIEF DESCRIPTION OF THE DRAWINGS

FIG. 10 illustrates an operation for a signal Table for the absence message and a password in the second embodiment.

DETAILED DESCRIPTION OF THE PREFERRED EMBODIMENTS

[First Embodiment]

The present embodiment relates to an automatic message record telephone apparatus for recording an incoming message (ICM) on a magnetic tape. In the present embodiment, the rotation of a tape reel mount of the magnetic tape is detected by counting pulse signals generated by the rotation. When the ICM is recorded on the magnetic tape, a beep tone is recorded together with the ICM, and the beep tone signal is detected when the magnetic tape is played back.

In the present embodiment, the count of the rotation pulses of the tape reel mount and the detection of the beep tone signal between ICM's are combined to increase the durability of the tape and a magnetic head and attain precise and rapid tape position control.

Figure 1:
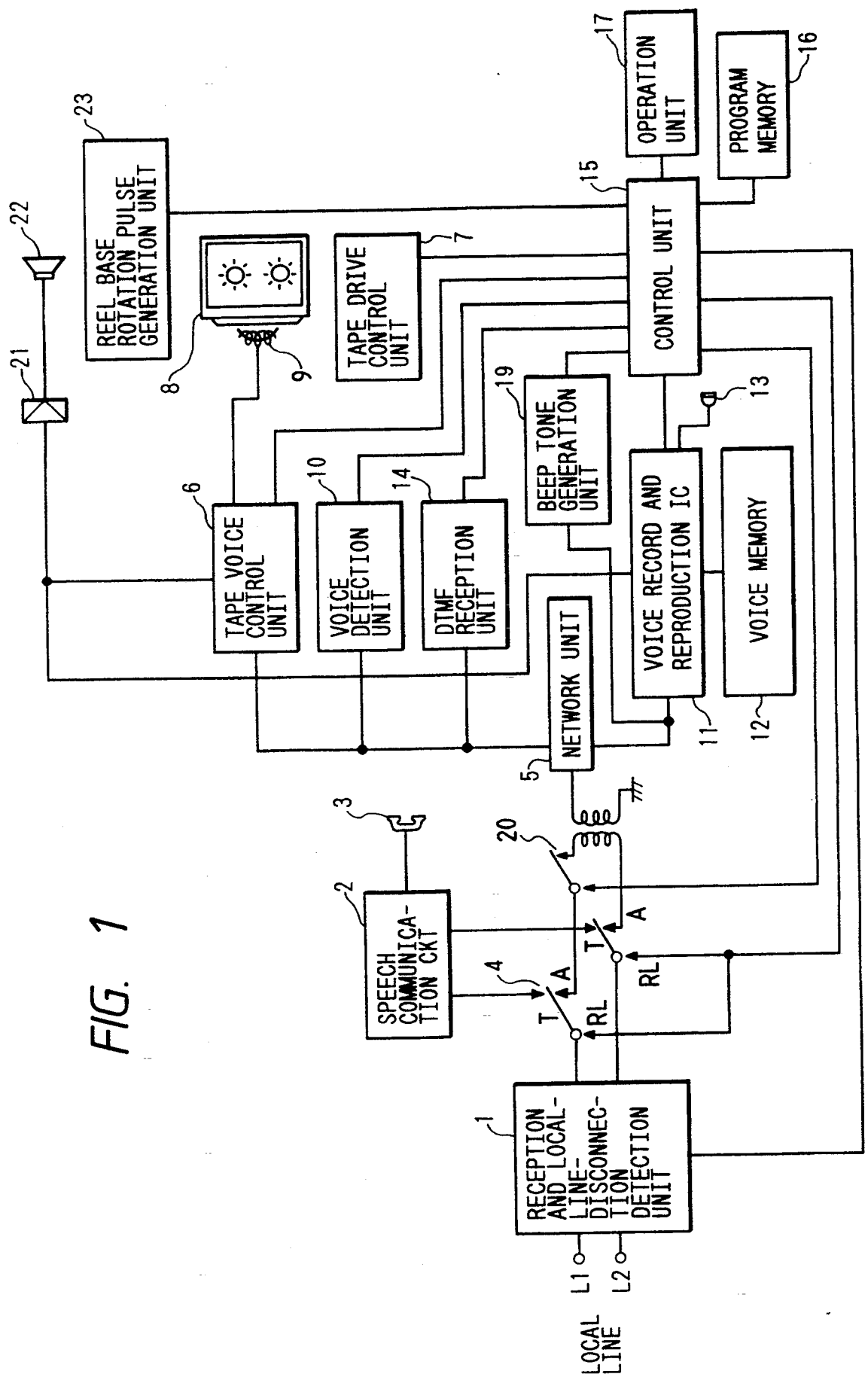
FIG. 1 shows a block diagram of a first embodiment of the present invention.

FIG. 1 shows a block diagram of the first embodiment.

The automatic message record telephone apparatus comprises a reception/local line disconnection detection unit 1 which detects reception of a call from a local line and momentary connection and disconnection of the local line when a DC loop is formed, a speech communication circuit 2 for permitting an operator to make ordinary speech communication when the operator is in the home, a hand set 3 for the speech communication, a relay 4 for switching the circuit between a speech mode and an absence mode, and a switch 20 for forming a DC loop.

The automatic message record telephone apparatus further comprises a network unit 5 for effecting two-wire/four-wire conversion between the local line (two-wire circuit) and a send signal/receive signal circuit (four-wire circuit) to balance them, a tape voice control unit 6 for controlling a voice level when it is recorded on or reproduced from a cassette tape 8, a tape drive control unit 7 for controlling the drive of the tape when the signal is recorded on or reproduced from the cassette tape 8, the cassette tape 8 for recording and retaining the ICM's of the calling parties, a magnetic head 9 for recording and reproducing the signal on or from the cassette tape 8, an amplifier 21 for amplifying a voice signal for playing back the tape, and a speaker 22.

The automatic message record telephone apparatus further comprises a voice detection unit 10 for detecting whether a voice signal from a calling party has arrived or not, a voice recording/reproducing IC (integrated circuit) for recording and reproducing the out-going message (OGM), a memory 12 controlled by the voice recording/reproducing IC 11 for holding digitized OGM voice data, a microphone 13 for recording the OGM by the voice recording/reproducing IC 11, a DTMF reception unit 14 for decoding a DTMF signal used for a remote control command in an external remote control mode, a control unit 15 for controlling the respective units, a program memory 16 for storing a control program, a operation unit 17 for an operator to carry out various operations, a beep tone generation unit 19, and a reel mount rotation pulse generation unit 23 for generating rotation pulses as a reel mount rotates when the cassette tape is driven.

In the arrangement described above, the relay 4 is in the T position in a normal mode and the operator, when he/she is in, makes the speech communication by the hand set 3 through the speech circuit 2.

When the operator is in, he/she operates the operation unit 17 to set the voice recording/reproducing IC 11 to a record mode to record an OGM through the microphone 13 in order to request the calling party to record the ICM. The digitized OGM voice information is stored in the memory 12.

Thereafter, the operator, when he/she goes out, sets the absence mode by operating the operation unit 17.

Figure 2:
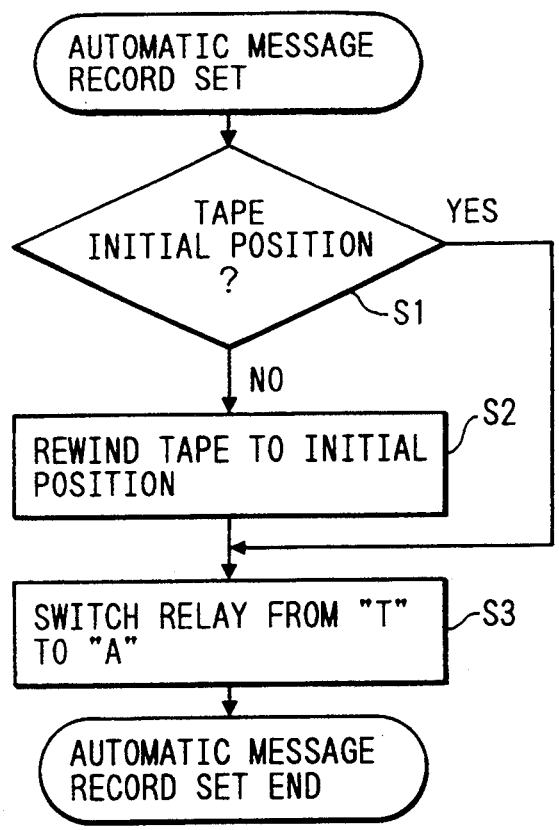
FIG. 2 shows a flow chart of an automatic message record setting operation in the first embodiment.

FIG. 2 shows a flow chart of the automatic message record setting operation.

When the absence mode is established, the cassette tape 8 is rewound to a leading edge position (S2) if it is not at the leading edge position (S1). The relay 4 is connected to the A position (S3).

Figure 3:
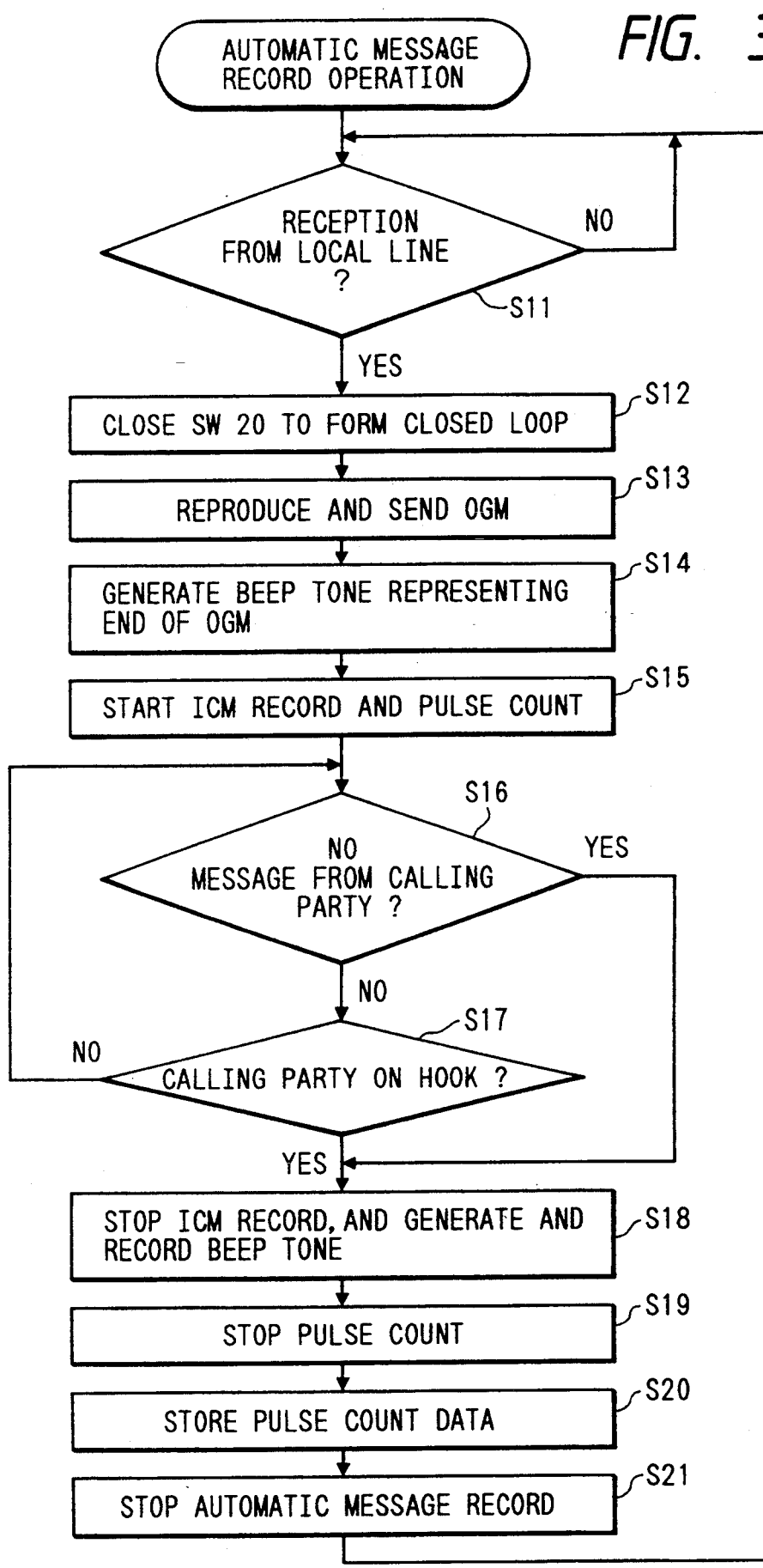
FIG. 3 shows a flow chart of an operation for a call received during an absence mode in the first embodiment.

FIG. 3 shows a flow chart of an operation when a call is received in the absence mode.

When the call is received from the local line (S11), the reception/local line disconnection detection unit 1 detects it. Thus, the control unit 15 closes the switch 20 to from a DC loop (S12).

Then, the control unit 15 sets the voice recording/reproducing IC 11 to a reproduce mode, reads the OGM previously recorded by the operator from the memory 12 and converts it to analog voice information, and sends it out to the local line through the network unit 5 (S13).

After the OGM has been sent out, the control unit 15 activates the beep tone generation unit 19 to request to the calling party to record the ICM (S14). Immediately thereafter, the tape voice control unit 6 and the tape drive control unit 7 are set to the record mode.

The rotation pulses generated by the reel mount rotation pulse generation unit 23 as the tape is rotated are sent to the control unit 15 and counted (S15).

When the calling party completes the recording of the ICM, the voice detection unit 10 detects a silent status due to the end of speech (S16), or the reception/- local line disconnection detection unit 1 detects the momentary connection and disconnection of a DC signal (CPC signal) which is generated by the calling party (S17) being on hook, and it is recognized as the end of the ICM of the calling party. Thus, the beep tone generator 19 is activated to record the beep tone on the tape for several seconds (S18) and the counting of the pulses is terminated (S19). The pulse count is stored in the memory in the control unit 15 (S20). The tape voice control unit 6 and the tape drive control unit 7 are deactivated and the DC loop is opened to terminate the automatic message record mode (S21).

In this manner, one ICM has been recorded.

Thereafter, when the reception/local line disconnection detection unit 1 detects the reception of a call, the above operation is repeated. In this manner, the ICM's of the calling parties are sequentially recorded.

FIGS. 4A to 4D illustrate tape position control when the ICM's thus recorded on the tape are played back by a remote control operation.

Figure 4:
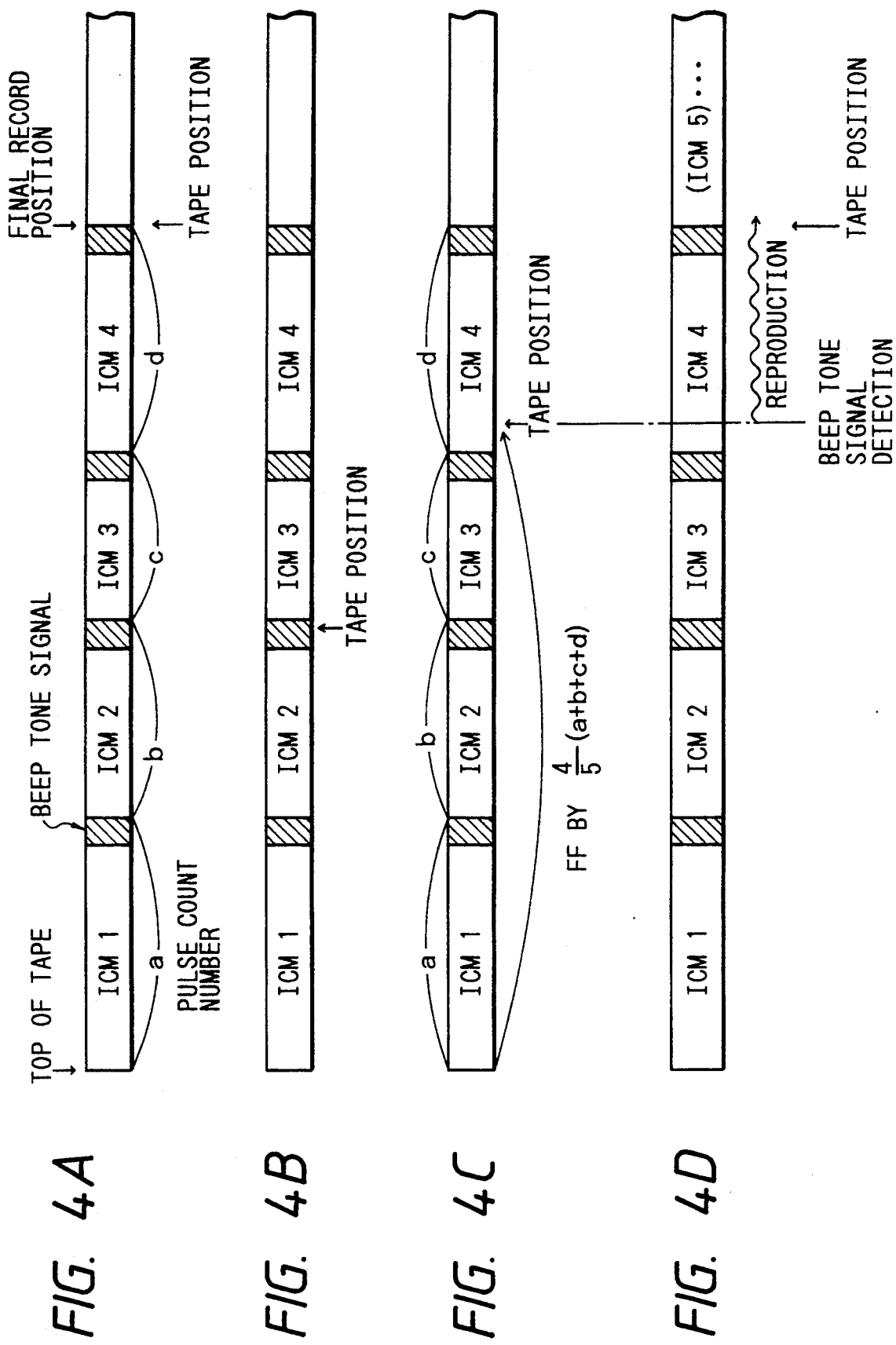
FIGS. 4A to 4D illustrate tape position control when an ICM recorded on a tape is played back by a remote control operation in the first embodiment.

In FIG. 4A, it is assumed that four ICM's, ICM 1 to ICM 4 have been recorded on the tape and the pulse counts of the ICM's are a, b, c and d, respectively.

Figure 5:
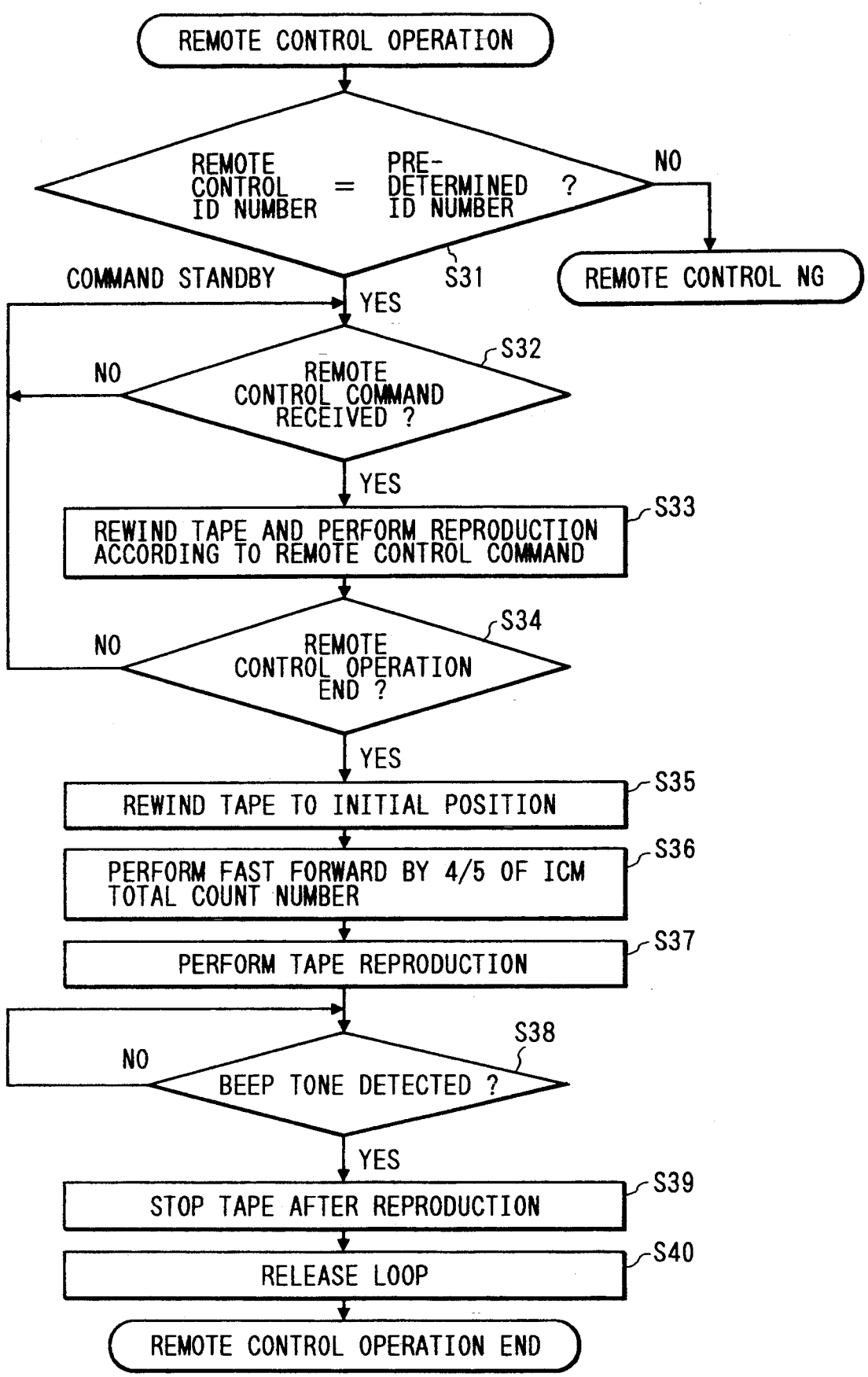
FIG. 5 shows a flow chart of an operation for playing back an ICM by a remote control operation of an operator who is outside the home in the first embodiment.
Figure 6:
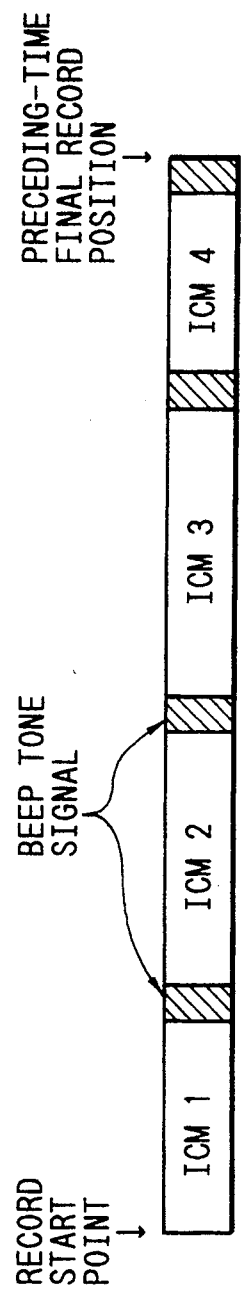
FIG. 6 shows a status of data recorded on a magnetic tape in a prior art apparatus.

FIG. 5 shows a flow chart of an operation when the operator who is out plays back the ICM by the remote control operation.

When a call has been received from the local line and a DC loop has been formed, a remove control password received from the calling party is decoded by the DTMF reception unit 14. If the received remote control password (ID number) is a predetermined one (S31), the control unit 15 stands by to receive a remote control command is received (S32), it is decoded by the DTMF reception unit 14, and the control unit 15 activates the tape control unit 7 in accordance with the command to rewind the tape to the start position, play back the tape, and send the ICM to the local line by the tape voice control unit 6 (S33).

As shown in FIG. 4B, if the operator sends out an end of remote control command when the playback of the ICM 2 is completed and disconnects the hand set (S34), an operation to rewind the tape to the last record position of the previous recording, that is, behind the ICM 4, is started.

The interruption of the playback of the ICM's by the remote control operation before the playback of all ICM's may be determined by the comparison of the number of times of detection of the beep tone by the voice detection unit 10 with the number of recorded ICM's.

First, the tape is stopped by the tape drive control unit 7, rewound to the leading edge position (tape start position) and it is stopped there (S35). As shown in FIG. 4C, while the rotation pulses are counted by the control unit 15 through the reel mount rotation pulse control unit 23, the tape is fast-forward fed with the magnetic head 9 being kept away from the tape for only 4/5 of the total count (a+b+c+d) of the ICM's (S36). The number 4/5 is set as a value which assures that the shift between the number of rotation pulses and the actual tape travel distance does not exceed the tape length for one ICM.

During the playback of the ICM by the remote control operation, the control unit counts the rotation pulses and it may fast-forward feed the tape for a difference between the count at the end of the remote control operation and 4/5 of the total count of the ICM's without rewinding the tape to the start position.

When the counting of 4/5 is completed, the tape voice control unit 6 and the tape drive control unit 7 are set to the record mode. As shown in FIG. 4D, the tape is played back from this position with the magnetic head 9 contacted to the tape (S37). When the beep tone is detected by the voice detection unit 10 during the playback of the tape (S38), the tape is stopped (S39), the DC loop is opened (S40) and the remote control operation is terminated.

As shown in FIG. 4D, the next ICM 5 is recorded following the ICM 4.

The end position of the fast-forward feed is not limited to 4/5 of the total count of the ICM's but it may be a total count less a predetermined number. The fast-forward feed may be terminated at a mid-point between the end position of the ICM 4 and the end position of the ICM 3. In this case, the fast-forward feed may be terminated at $(a+b+c+d)/2$.

In the present embodiment, the playback by the remote control operation has been explained. The present invention is also applicable to playback instructed from the console unit 17.

In the present embodiment, the playback is stopped by the detection of the beep tone. A predetermined signal may be used instead of the beep tone.

In the present embodiment, a voice message is recorded and reproduced. Alternatively, a video message may be recorded and reproduced. In this case, the reproduction may be stopped when a specific video image, for example, a white image is detected.

In the present embodiment, the voice recording/reproducing IC is used for the OGM recording system and the tape recording system with the cassette tape is used as the ICM recording system. Alternatively, the tape recording system may be used for both the OGM and the ICM.

In accordance with the present embodiment, the counting of the rotation pulses of the tape reel mount and the detection of the beep tone signal between ICM's are combined to increase the durability of the tape and the magnetic head and attain the rapid and precise tape position control.

[Second Embodiment]

The present embodiment relates to an automatic message record telephone apparatus which can be remotely controlled from another telephone set. It comprises a memory unit for registering a plurality of passwords and a control unit for discriminating a message to be reproduced in accordance with a password received in the remote control operation.

In the present embodiment, a plurality of passwords are registered and the message to be reproduced is discriminated in accordance with the password received in the remote control operation so that specified message can be kept secret in accordance with a user. Since only the specified messages are reproduced, the desired messages can be efficiently played back.

Figure 7:
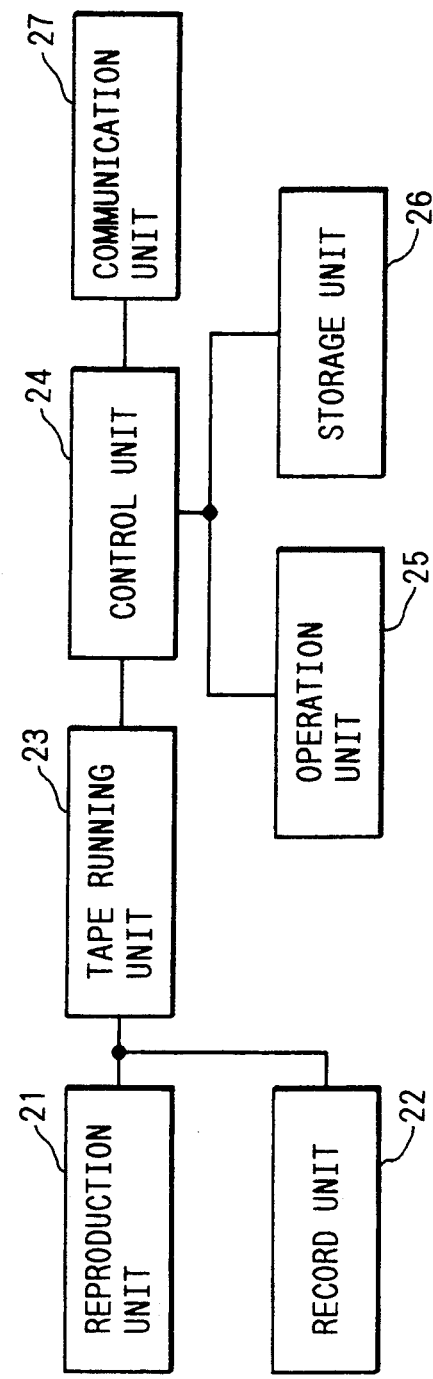
FIG. 7 shows a block diagram of a second embodiment of the present invention.

FIG. 7 shows a block diagram of the present embodiment.

The automatic message record telephone apparatus comprises a reproduction unit 21 for reproducing voice recorded on a tape, a record unit 22 for recording voice on the tape, a tape running unit 23 for transporting the tape, a control unit 24 such as a CPU for controlling overall system, a operation unit 25 for entering a password, a memory 26 for storing passwords and a signal table, and a communication unit 27 for communicating signals with other telephone set.

Figure 8:
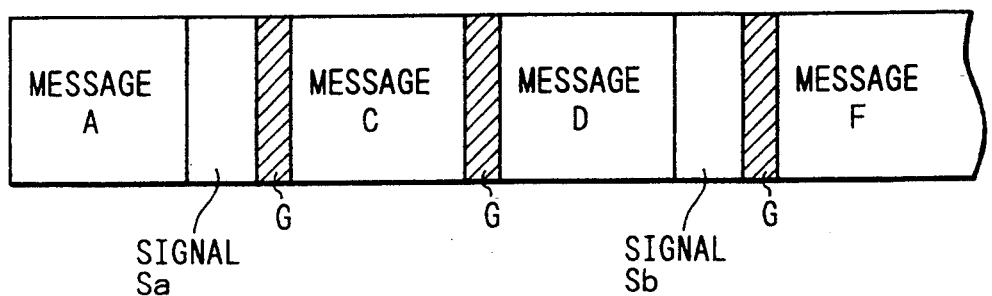
FIG. 8 shows a status of absence message recorded on a tape in the second embodiment.
Figure 9:
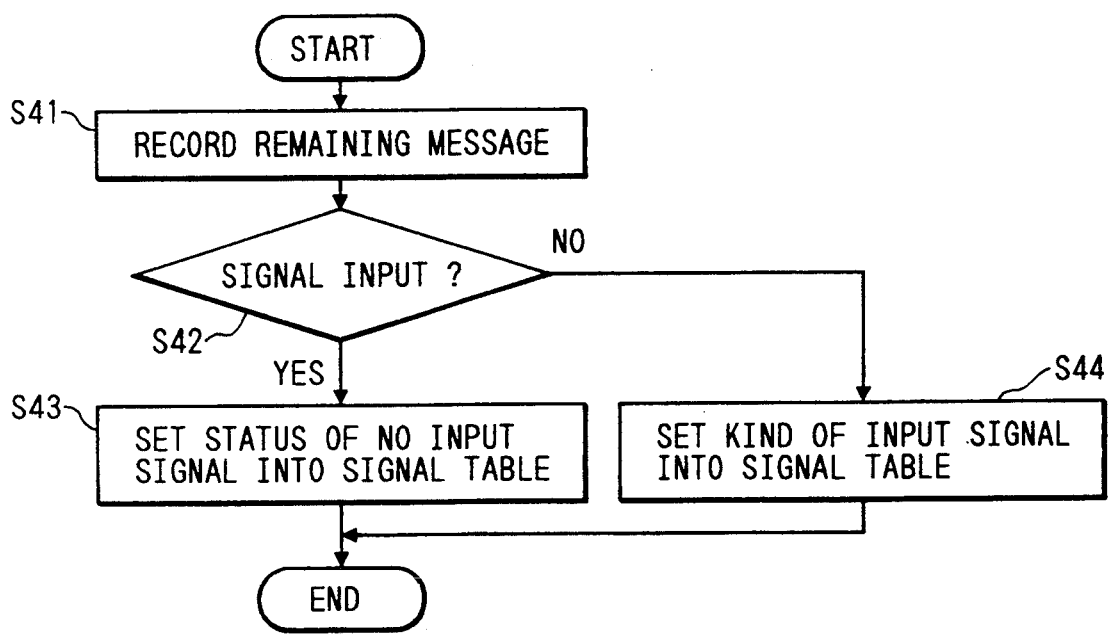
FIG. 9 shows a flow chart of an operation for recording the absence message in the second embodiment.

As shown in FIG. 8, in the present automatic message record telephone apparatus, a predetermined identification signal Sa (for example, DTMF signal) is recorded following to the recording of a message A. An identification signal Sb is similarly recorded following an absence message D. A punctuation G is provided between absence messages. This signal is entered by an operator when he/she records a message. This process is explained with reference to FIG. 9.

When an absence message is recorded (S41), the control unit 24 checks to determine if an identification signal (for example, DTMF signal) has been entered or not (S42). If it has not been entered, the control unit 24 sets a no-signal input status in the signal table in the memroy unit 26 (S43), and if the identification signal has been entered, the type of the signal is set in the signal table (S44). The identification may be a DTMF singal corresponding to "#" key or "*" key.

FIG. 10 illustrates an operation to the signal table and the password.

The signal table stores the status of the identification signal for each message number. The message number 1 stores the status Ta of the identification signal Sa, and the message number 3 stores the status Tb of the identification signal Sb. The message numbers 2 and 4 store no status signal indicating that there is no identification signal.

When a password Pa is sent by a remote control operation, only the status Ta and a message of no signal are reproduced as shown by (circle). Similarly, when a password Pb is sent, only the status Tb and the message of no signal are reproduced. A symbol " ↓ " indicates fast-forward feed until the next message.

Figure 11:
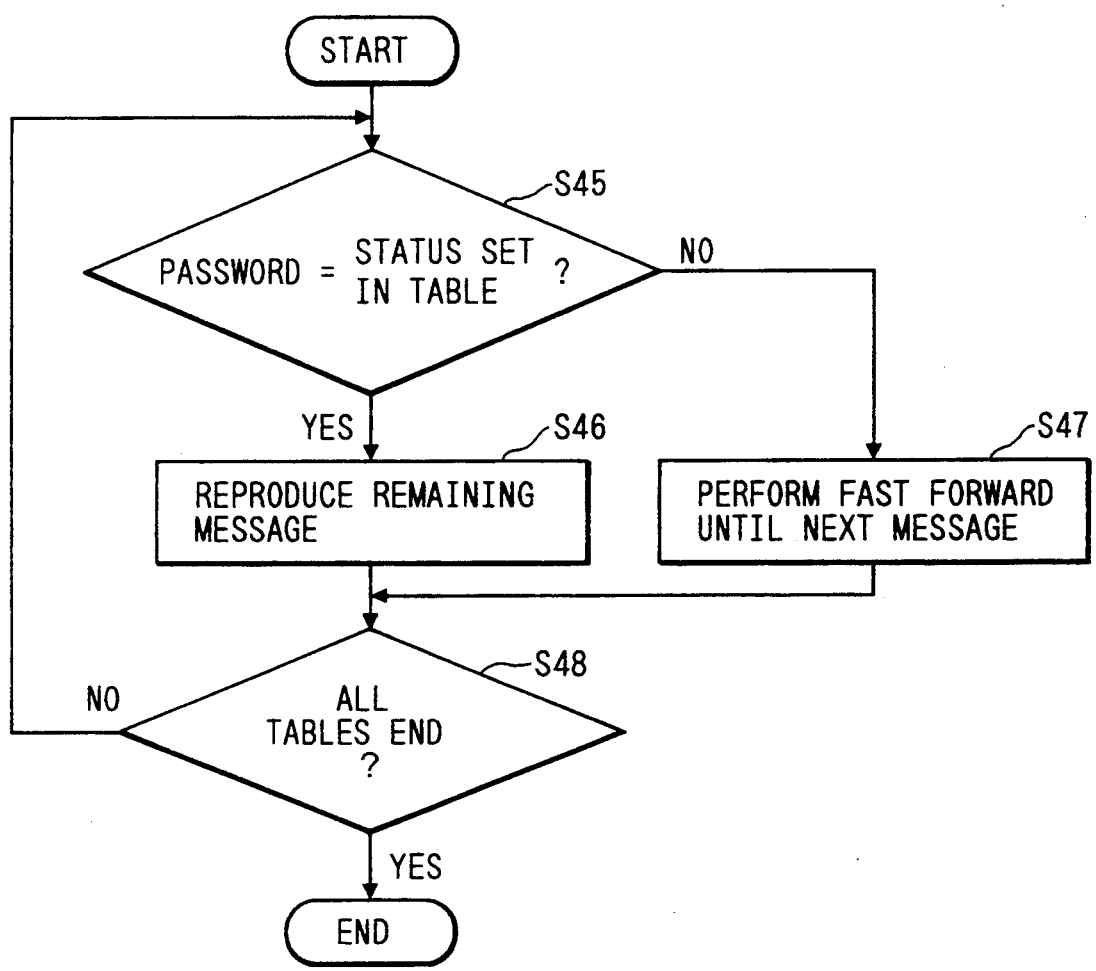
FIG. 11 shows a flow chart of a reproducing operation of a message by the password in the second embodiment.

FIG. 11 shows a flow chart of the reproduction operation of the message by the password.

The control unit 24 compares the status stored in the signal table of the message and the password used for the remote control operation (S45), and if they match, it reproduces the message (S46), and if they do not match, it does not reproduce the message but fast-forward feeds the tape until the next message position is reached (S47). When the entire table has been referred, the reproduction operation is completed.

In the present embodiment, where there is no signal recorded, any password is acceptable for reproduction.

In accordance with the present invention, a plurality of passwords are provided and the message corresponding to the password used in the remote control operation is reproduced. Thus, the secrecy is secured even if one automatic message record telephone apparatus is shared by a plurality of persons. Further, since it is not necessary to play back unnecessary absence messages, time efficiency is enhanced and a telephone charge is saved.

In the present embodiment, when a password is designated, a message having the identification signal corresponding to the password and a message having no identification signal are reproduced. Alternatively, only the message having the identification signal corresponding to the password may be reproduced. Further, after the message having the corresponding identification signal has been reproduced, the message having no identification signal may be reproduced.

In the present embodiment, the operation by the remote control has been explained. The present invention is also applicable to an operation where the reproduction is instructed by the console unit 25.

In the present embodiment, the recording and reproduction of the voice signal have been explained. The present invention is also applicable to the recording and reproduction of a video signal.

While the preferred embodiments of the present invention have been described, the present invention is not limited to those embodiments but various modifications may be done without departing from the scope of the claims.

We claim:

1. A recording and reproduction apparatus comprising:

recording and reproduction means for recording information on a medium, and reproducing the information recorded on the medium wherein said recording and reproduction means records predetermined information after first information is recorded;

generating means for generating a signal depending upon an operation of said recording and reproduction means and independently of the information on the medium: and control means for controlling said recording and reproduction means to reproduce the information recorded on the medium, wherein said control means detects a record termination position by using the predetermined information recorded at the record termination position on the medium in accordance with a reproduction interruption, the detection being performed during a period of time determined by the signal generated by said generating means.

2. An apparatus according to claim 1, wherein said control means stops the reproduction of the information by said recording and reproduction means when the information recorded at the record termination position is reproduced by said recording and reproduction means.

3. An apparatus according to claim 1, wherein the medium is a magnetic tape and said recording and reproduction means comprises a magnetic head.

4. An apparatus according to claim 1, wherein said control means returns said recording and reproduction means to record termination position where the reproduction of the information by said recording and reproduction means is interrupted.

5. An information reproduction apparatus comprising:

reproduction means for reproducing information recorded on a medium;

generating means for generating a signal depending upon an operation of said reproduction means and independently of the information on the medium; and control means for controlling said reproduction means by instructing said reproduction means to interrupt the reproduction of the information in accordance with an interruption instruction, by instructing said reproduction means to resume the reproduction in the vicinity of a position at which specific information for specifying a record termination position has been recorded in accordance with the signal generated by said generating means, and by instructing said reproduction means to stop the reproduction when the specific information is reproduced by said reproduction means.

6. An apparatus according to claim 5, wherein said medium is a magnetic tape and said reproduction means comprises a magnetic head.

7. An apparatus according to claim 5, wherein said reproduction means has a function to record the information on said medium.

8. An apparatus according to claim 5, wherein said control means stores therein data according to the position at which the specific information has been recorded.

9. A recording and reproduction apparatus comprising:
   recording and reproduction means for recording information on a medium and reproducing the information recorded on the medium, wherein said recording and reproduction means performs reproduction of predetermined information recorded at a record termination position;
   generating means for generating a signal depending upon an operation of said recording and reproduction means and independently of the information on the medium; and
   control means for controlling said recording and reproduction means to interrupt the reproduction of the information by said recording and reproduction means in accordance with an interruption instruction, to resume the reproduction from a position according to the signal generated by said generating means, and to start the recording of information from a position determined by the reproduction of predetermined information by said recording and reproduction means.

10. An apparatus according to claim 9, wherein said medium is a magnetic tape and said record and reproduction means comprises a magnetic head.

11. An automatic message recording telephone apparatus comprising:
   reception means for receiving first, second and third messages and first and second identification data from a line;
   memory means for storing first, second and third messages, and first and second identification data, wherein the first message is stored to correspond to the first identification data, the second message is stored to correspond to the second identification data, and the third message is stored without corresponding to the first and second identification data; and
   reproduction means for reproducing the first and third messages in accordance with the designation of a first password, and for reproducing the second and third messages in accordance with the designation of a second password,
   wherein the first and second passwords correspond to the first and second identification data, respectively.

12. An apparatus according to claim 1, wherein said control means controls said recording and reproduction means to start the reproduction of the information from a position in the vicinity of the position represented by the position data, and to stop the reproduction of the information recorded at the record termination position.

13. An apparatus according to claim 1, wherein said control means controls said recording and reproduction means to start the reproduction of the information according to the signal, in accordance with interruption of the reproduction of the information by said recording and reproduction means.

14. An apparatus according to claim 1, wherein said recording and reproduction means records a predetermined tone signal as the information recorded at the record termination position.

15. An apparatus according to claim 3, wherein said control means fast forwards the magnetic tape from a position on the magnetic tape at which the information is reproduced until the signal is generated by said generating means.

16. An apparatus according to claim 5, wherein said control means fast forwards the magnetic tape from a position on the magnetic tape at which the information reproduction is interrupted to the vicinity of the position.

17. An apparatus according to claim 10, wherein said control means fast forwards the magnetic tape from a position on the magnetic tape at which information reproduction is interrupted to the position according to the signal generated by generating means.

18. An apparatus according to claim 11, wherein said memory means has a magnetic tape for sequentially storing the first, second and third messages, and
   said reproduction means reproduces the first message in accordance with the designation of the first password, fast forwards an area on the magnetic tape at which the second message is stored, and reproduces the third message.

19. An apparatus according to claim 11, wherein said reproduction means does not reproduce the second message when the first password is designated, and does not reproduce the first message when the second password is designated.

20. An apparatus according to claim 11, wherein said reproduction means comprises second reception means for receiving the password from the line.

21. A method for detecting a record termination position, comprising the steps of:
   generating a signal depending upon a driving of a medium and independently of information on the medium;
   reproducing information recorded on the medium and performing a reproduction of information corresponding to information recorded at a record termination position on the medium; and
   detecting the record termination position using the reproduction of information corresponding to the information recorded at the record termination position on the medium in accordance an interruption in reproduction, the detection being performed according to the signal generated in said generating step.

22. A method according to claim 21, wherein said detecting step comprises the step of abstaining from reproducing the information outside the range according to the signal generated in said generating means.

23. A method according to claim 21, further comprising the steps of:
   recording predetermined information at the record termination position; and
   storing the position data according to the position at which the predetermined information is stored in said recording step.

24. A method according to claim 21, wherein the predetermined information includes a predetermined tone signal.

25. A method according to claim 21, wherein said reproducing step comprises the step of reproducing the information according to the signal on the basis of an interruption of information reproduction.

26. A method according to claim 21, wherein said reproducing step comprises the step of interrupting the reproduction on the basis of an interruption of information reproduction, and restarting the reproduction from the position according to the signal.

27. A method according to claim 21, wherein said reproducing step comprises the step of restarting the recording of the information from the detected record termination position.

28. A method according to claim 21, wherein the signal generated in said generating step is generated in synchronism with rotation of the medium.

29. A method according to claim 21, wherein the medium includes a magnetic tape.

30. A method according to claim 21, further comprising the step of switching a drive speed of the medium between a high speed before generation of the signal and a low speed after generation of the signal.

31. An apparatus according to claim 1, wherein said generating means generates the signal in synchronism with drive of the medium.

32. An apparatus according to claim 1, wherein said control means drives the medium at a high speed in accordance with the reproduction interruption and switches the drive speed of the medium between a high speed before generation of the signal and a low speed after generation of the signal.

33. An apparatus according to claim 5, wherein said generating means generates the signal in synchronism with drive of the medium.

34. An apparatus according to claim 5, wherein said control means drives the medium at a high speed in accordance with the reproduction interruption and switches the drive speed of the medium between a high speed before generation of the signal and a low speed after generation of the signal.

35. An apparatus according to claim 9, wherein said generating means generates the signal in synchronism with drive of the medium.

36. An apparatus according to claim 9, wherein said control means drives the medium at a high speed in accordance with the reproduction interruption and switches the drive speed of the medium between a high speed before generation of the signal and a low speed after generation of the signal.

37. An automatic message recording telephone apparatus comprising:
reception means for receiving first, second, and third messages from a line;
memory means for storing the first message corresponding to first identification data, the second message corresponding to second identification data, and the third message without corresponding to the first and second identification data; and
reproduction means for reproducing the first and third messages in accordance with a designation of the first identification data, and for reproducing the second and third messages in accordance with a designation of the second identification data.

38. An apparatus according to claim 37, wherein said memory means includes a magnetic tape for storing the first, second, and third messages.

39. An apparatus according to claim 37, wherein said reproduction means does not reproduce the second messages when the first identification data is designated, and does not reproduce the first message when the second identification data is designated.

40. An apparatus according to claim 37, wherein said reception means further receives the first and the second identification data from the line.

41. An apparatus according to claim 40, wherein said reproduction means reproduces the first and third messages when the first identification data is received by said reception means, and reproduces the second and third messages when the second identification data is received by said reception means.

* * * * *

UNITED STATES PATENT AND TRADEMARK OFFICE
CERTIFICATE OF CORRECTION

PATENT NO. : 5,367,560
DATED : November 22, 1994
INVENTOR(S) : Yoshiyuki WATANABE et al.

It is certified that error appears in the above-indentified patent and that said Letters Patent is hereby corrected as shown below:

COLUMN 1

Line 35, "see" should read --. The message--.
Line 44, "set" should read --sets--.

COLUMN 2

Line 47, "coowner" should read --co-owner--.

COLUMN 4

Line 22, "a" should read --an--.
Line 50, "from" should read --form--.

COLUMN 5

Line 28, "remove" should read --remote--.

COLUMN 6

Line 22, "console" should read --operation--.
Line 56, "specified" should read --a specified--.
Line 67, "a operation" should read --an operation--.

UNITED STATES PATENT AND TRADEMARK OFFICE
CERTIFICATE OF CORRECTION

PATENT NO. : 5,367,560

DATED : November 22, 1994

INVENTOR(S) : Yoshiyuki WATANABE et al.

It is certified that error appears in the above-indentified patent and that said Letters Patent is hereby corrected as shown below:

COLUMN 7

Line 2, "other" should read --another--.
    Line 6, "to" should be deleted.
    Line 19, "singal" should read --signal--.
    Line 32, "(circle)" should read --O (circle).--

COLUMN 8

Line 2, "console" should read --operation--.
    Line 46, "record" should read --the record--.

COLUMN 9

Line 34, "record" should read --recording--.

COLUMN 10

Line 50, "accordance" should read --accordance with--.

UNITED STATES PATENT AND TRADEMARK OFFICE
CERTIFICATE OF CORRECTION

PATENT NO. : 5,367,560 Page 3 of 3
DATED : November 22, 1994
INVENTOR(S) : Yoshiyuki WATANABE et al.

It is certified that error appears in the above-indentified patent and that said Letters Patent is hereby corrected as shown below:

<u>COLUMN 12</u>

Line 29, "messages" should read --message--.

Signed and Sealed this

Twenty-third Day of May, 1995

Attest:

BRUCE LEHMAN

Attesting Officer   Commissioner of Patents and Trademarks